(12) United States Patent
Carter

(10) Patent No.: US 11,950,589 B2
(45) Date of Patent: Apr. 9, 2024

(54) BAT DETERRENT ULTRASONIC TRANSDUCER FOR WIND TURBINE APPLICATIONS

(71) Applicant: Mide Technology Corporation, Woburn, MA (US)

(72) Inventor: Robert Carter, Arlington, MA (US)

(73) Assignee: MIDE Technology Corporation, Woburn, MA (US)

( * ) Notice: Subject to any disclaimer, the term of this patent is extended or adjusted under 35 U.S.C. 154(b) by 657 days.

(21) Appl. No.: 17/173,529

(22) Filed: Feb. 11, 2021

(65) Prior Publication Data

US 2021/0251213 A1     Aug. 19, 2021

Related U.S. Application Data

(60) Provisional application No. 62/975,974, filed on Feb. 13, 2020.

(51) Int. Cl.
*B06B 1/06* (2006.01)
*A01M 29/18* (2011.01)

(52) U.S. Cl.
CPC .......... *A01M 29/18* (2013.01); *B06B 1/0644* (2013.01); *B06B 2201/55* (2013.01); *B06B 2201/75* (2013.01)

(58) Field of Classification Search
CPC .................................................. B06B 1/0644
See application file for complete search history.

(56) References Cited

U.S. PATENT DOCUMENTS

| | | | | |
|---|---|---|---|---|
| 2013/0249218 A1* | 9/2013 | Vassilev | ................... | F03D 80/10 290/55 |
| 2014/0169968 A1* | 6/2014 | Hedeen | ................... | F03D 80/00 416/146 R |
| 2016/0366875 A1* | 12/2016 | Green | ................... | A01M 29/18 |
| 2020/0226480 A1* | 7/2020 | Johnston | ................. | H04N 7/188 |
| 2021/0251213 A1* | 8/2021 | Carter | .................... | G10K 9/122 |

* cited by examiner

*Primary Examiner* — Bryan P Gordon
(74) *Attorney, Agent, or Firm* — Iandiorio Teska & Coleman, LLP

(57) ABSTRACT

An ultrasonic transducer for wind turbine applications. The transducer includes a housing with a central diaphragm portion, a peripheral wall thereabout, and a flexure portion supporting the diaphragm portion relative to the peripheral wall. The apex of a cone is secured to the housing central diaphragm portion and the cone has a peripheral rim secured to the metal housing peripheral wall. A driver such as a piezoelectric element is secured to the housing central diaphragm portion opposite the cone apex.

22 Claims, 7 Drawing Sheets

BAT DETERRENT ULTRASONIC TRANSDUCER FOR WIND TURBINE APPLICATIONS

RELATED APPLICATIONS

This application claims benefit of and priority to Provisional Application Ser. No. 62/975,974 flied Feb. 13, 2020, under 35 U.S.C. §§ 119, 120, 363, 365, and 37 C.F.R. § 1.55 and § 1.78, which is incorporated herein by this reference.

FIELD OF THE INVENTION

This disclosure relates to ultrasonic transducers and, in one specific application, an ultrasonic transducer for wind turbine application in order to deter bats.

BACKGROUND OF THE INVENTION

Wind power via wind turbines is beneficial to humans but can harm or kill bats that fly into the turbine blades. Ultrasonic sound in the frequency range of 25 kHz-100 kHz may be effective at deterring bats by interfering with the sonar used by bats to hunt insects. Thus, U.S. Pat. No. 9,706,766, incorporated herein by this reference, discloses a nozzle located on the turbine nacelle emitting ultrasonic sound when pressurized air flows through the nozzle, But, this system requires a source of pressurized air and the required plumbing from the source to the nozzle.

U.S. Pat. No. 10,034,471, also incorporated herein by this reference, discloses acoustic transmitters in sockets formed in the wind turbine blades and arranged along the length of the wind turbine blades. But, installation of such transducers may be problematic.

BRIEF SUMMARY OF THE INVENTION

Featured is a new ultrasonic transducer particularly adapted, in one aspect, for wind turbine blades. The transducer is sealed against environmental conditions and operable even when exposed to water, freeze/thaw cycles, and vacuum/pressure cycling. Further featured is an ultrasonic transducer which is not affected in operation when exposed to 20 g acceleration forces for extended periods of time. Also featured is an ultrasonic transducer having an extremely low profile to avoid excessive drag and/or noise. Also featured is an ultrasonic transducer capable of sound pressure levels of 80 dB at 20 meters. Further featured is an ultrasonic transducer having a wide beam angle. Further featured is an ultrasonic transducer having a high electrical to acoustic energy conversion efficiency in order to minimize power when multiple transducers are installed on a single turbine blade. Further featured is a broad band ultrasonic transducer covering, in one example, 20 kHz to 60 kHz in order to provide warning for multiple species of bats. Further featured is a lightweight transducer.

Featured is an ultrasonic transducer for wind turbine applications. A housing includes a central diaphragm portion, a peripheral wall thereabout, and a flexure portion supporting the diaphragm portion relative to the peripheral wall. A cone has an apex secured to the housing central diaphragm portion and a peripheral rim secured to the metal housing peripheral wall. A driver is secured to the housing central diaphragm portion opposite the cone apex. The transducer may be coupled to one or more blades of a wind turbine.

The driver is preferably a piezoelectric element. The housing and cone may be made of metal. In one example, the flexure is vertically stiff to support the housing central diaphragm portion and the metal cone and compliant in flexure allowing the housing central diaphragm portion to flex.

In one example, the flexure portion depends downward from the central diaphragm portion and the flexure portion is connected to the peripheral wall by a lateral outwardly extending portion. In another example, the flexure portion extends upward from the central diaphragm portion and the flexure portion is connected to the peripheral wall by a lateral outwardly extending portion. The transducer may further include a wind screen over the cone. The wind screen can be made of an acoustically transparent material. The transducer may further include a printed circuit board over the driver.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
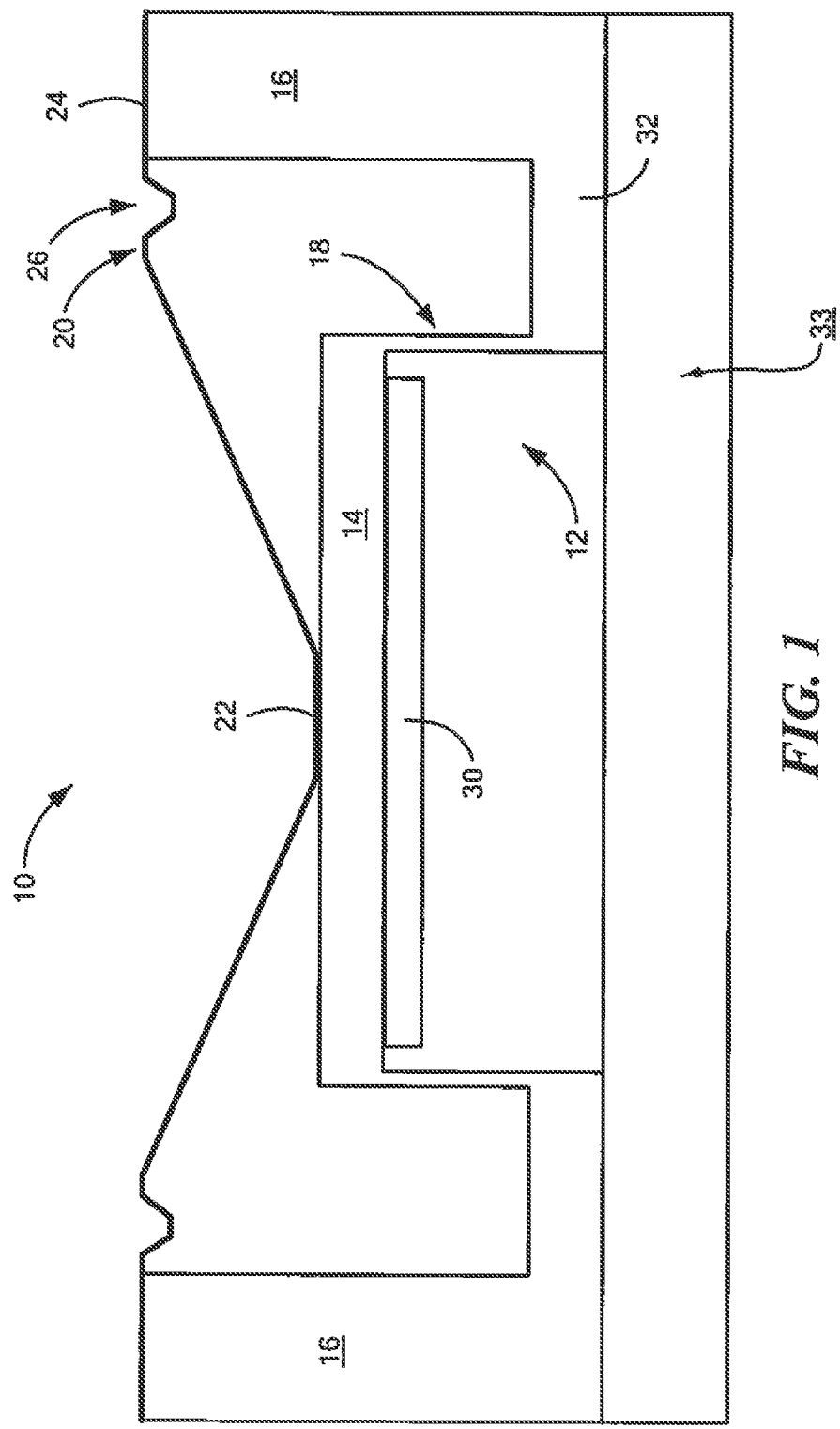
FIG. 1 is a schematic cross sectional view of an embodiment of a new ultrasonic transducer in accordance with aspects of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 3:
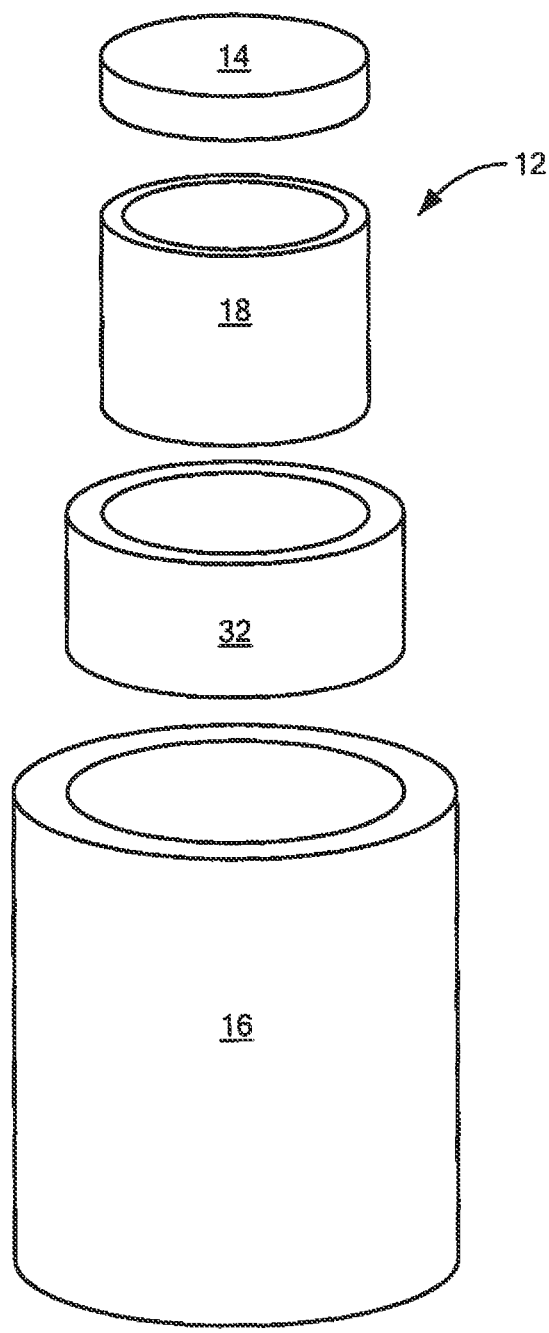
FIG. 3 is an exploded view of a transducer housing.

In one embodiment, ultrasonic transducer 10, FIG. 1 includes metal (e.g., aluminum) housing 12 including central diaphragm portion 14, peripheral (e.g., circular) wall 16 thereabout, and flexure portion 18 supporting diaphragm portion 14 relative to peripheral wall 16. Preferably, flexure portion 18 is a vertically stiff column supporting the rim of diaphragm portion 14 hut compliant in flexure permitting the diaphragm portion 14 to flex relatively freely when driven by driver 30 (e.g., a piezoelectric element). Metal (e.g., stainless steel) cone 20 has an apex 22 secured (e.g., bonded) to housing central diaphragm portion 14 and peripheral rim 24 secured (e.g., bonded) to metal housing peripheral wall 16. Backplane 33 can also be added. The result is a watertight construction. Cone 20 may include one or more flexure portions 26 (e.g., bellows). Piezoelectric element 30 is secured (e.g., bonded) to metal housing central diaphragm portion 14 opposite cone apex 22. In the design of FIG. 1, flexure portion 18 depends downward from diaphragm portion 14 and is connected to peripheral wall 16 by laterally outwardly extending portion 32, FIG. 3 shows, for illustration purposes, since housing 12 is preferably unitary in construction, the different housing components.

Figure 2:
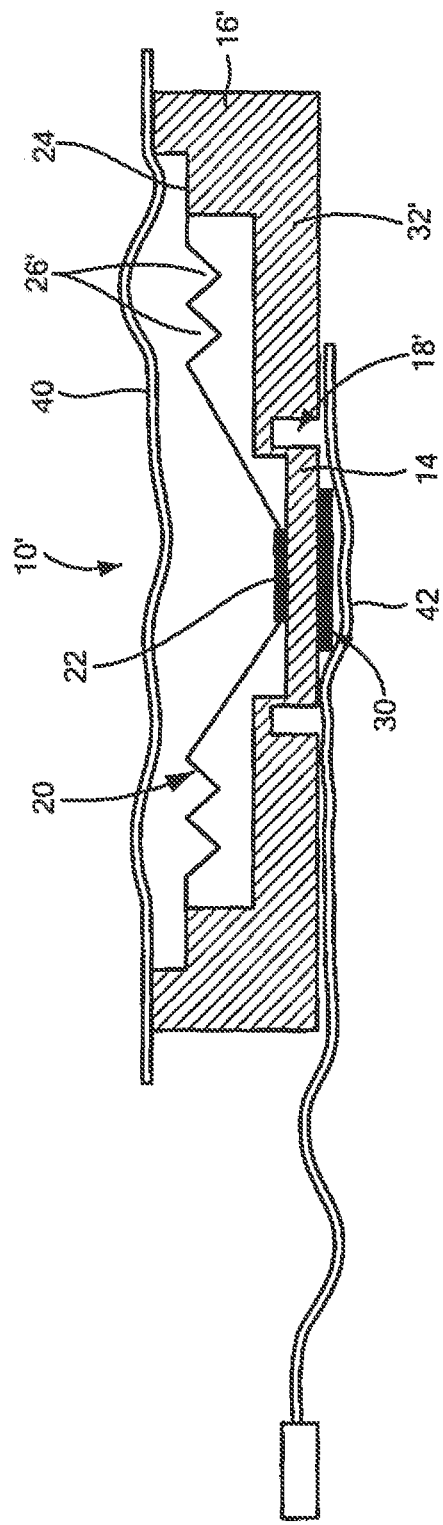
FIG. 2 is a schematic cross sectional view of another example of an ultrasonic transducer in accordance with aspects of the invention.

In another embodiment shown in FIG. 2 for transducer 10', flexible portion 18' extends upward from central diaphragm portion 14 and is connected to peripheral wall 16' by laterally outwardly extending portion 32'. In one embodiment, the transducer is ¼" tall and thus has a very low profile so it can be secured to the face of a turbine blade with minimal air drag contribution. Central diaphragm portion 14 may be 0.020 to 0.100 inches thick and 1.25 to 3.0 inches in diameter. The flexure portion may be 0.005 to 0.040 inches thick and between 0.1 and 0.3 inches in height. Wall 16 may be 0.2 to 0.5 inches thick, 1.75 inches in diameter, and 0.25 to 0.5 inches tall. Cone 20 may be 0.002 to 0.004 inches thick.

Figure 4:
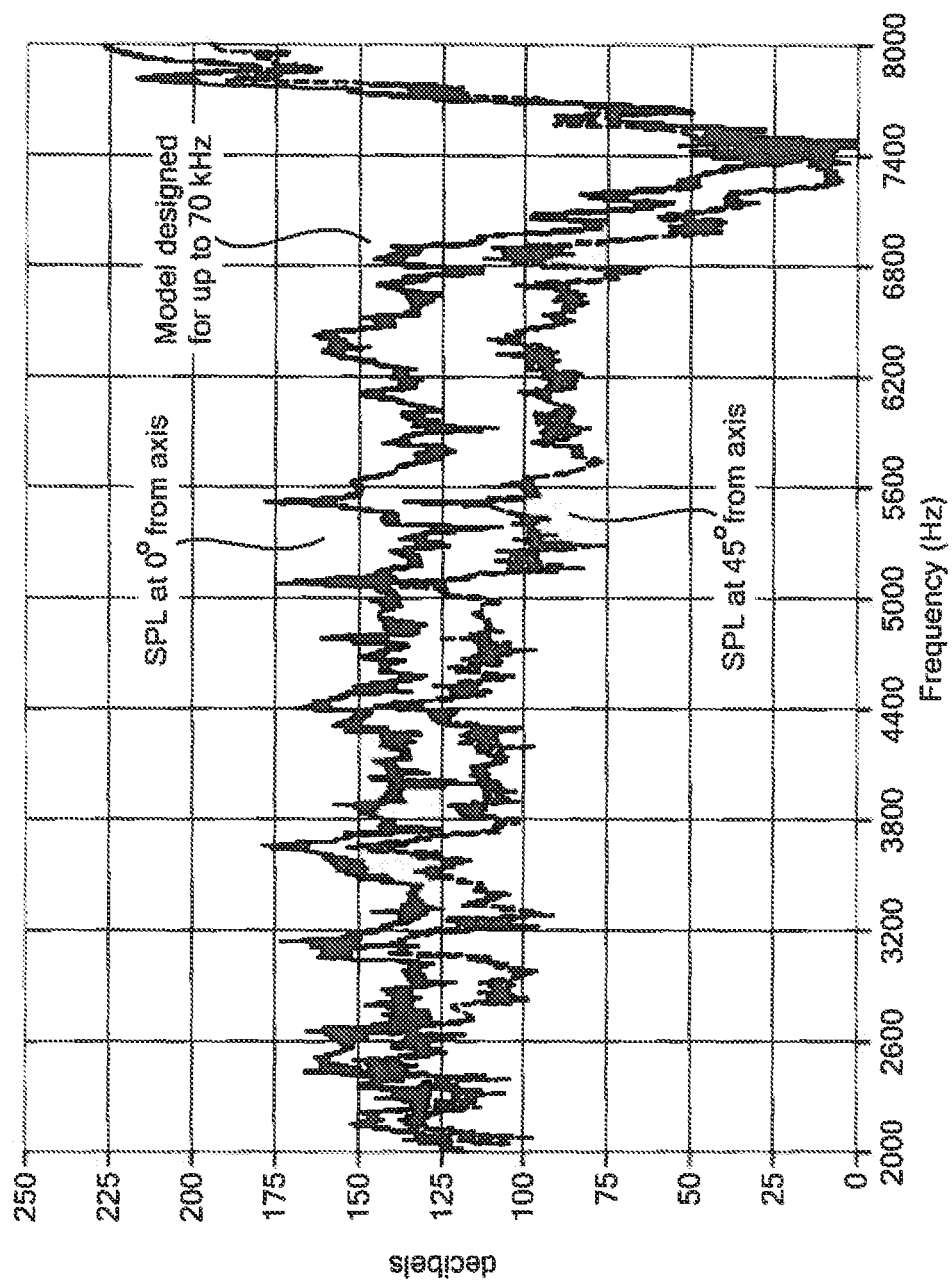
FIG. 4 is a graph depicting various decibels levels at different frequencies output by the ultrasonic transducers of FIGS. 1-3.

FIG. 4 shows the results of an PEA simulation of the transducers sound pressure level output (SPL, in dB) vs. frequency when it is mounted on an infinite reflective plane (mimicking a wind turbine wing surface). In the simulation the SPL was taken for 0°+45° from axis at a range of 10 inches from the center of the cone which is almost 20 sound wavelengths at 20 kHz and more than 50 wavelengths at 60 kHz and so can be considered a valid foundation for estimating SPL's in the far field at ranges in the 10's of meters. It has a fairly flat frequency response, 100 decibels or more between frequencies of 20,000 to about 62000 Hz, far flatter than the typical commercially available single frequency ultrasonic sources.

Figure 5:
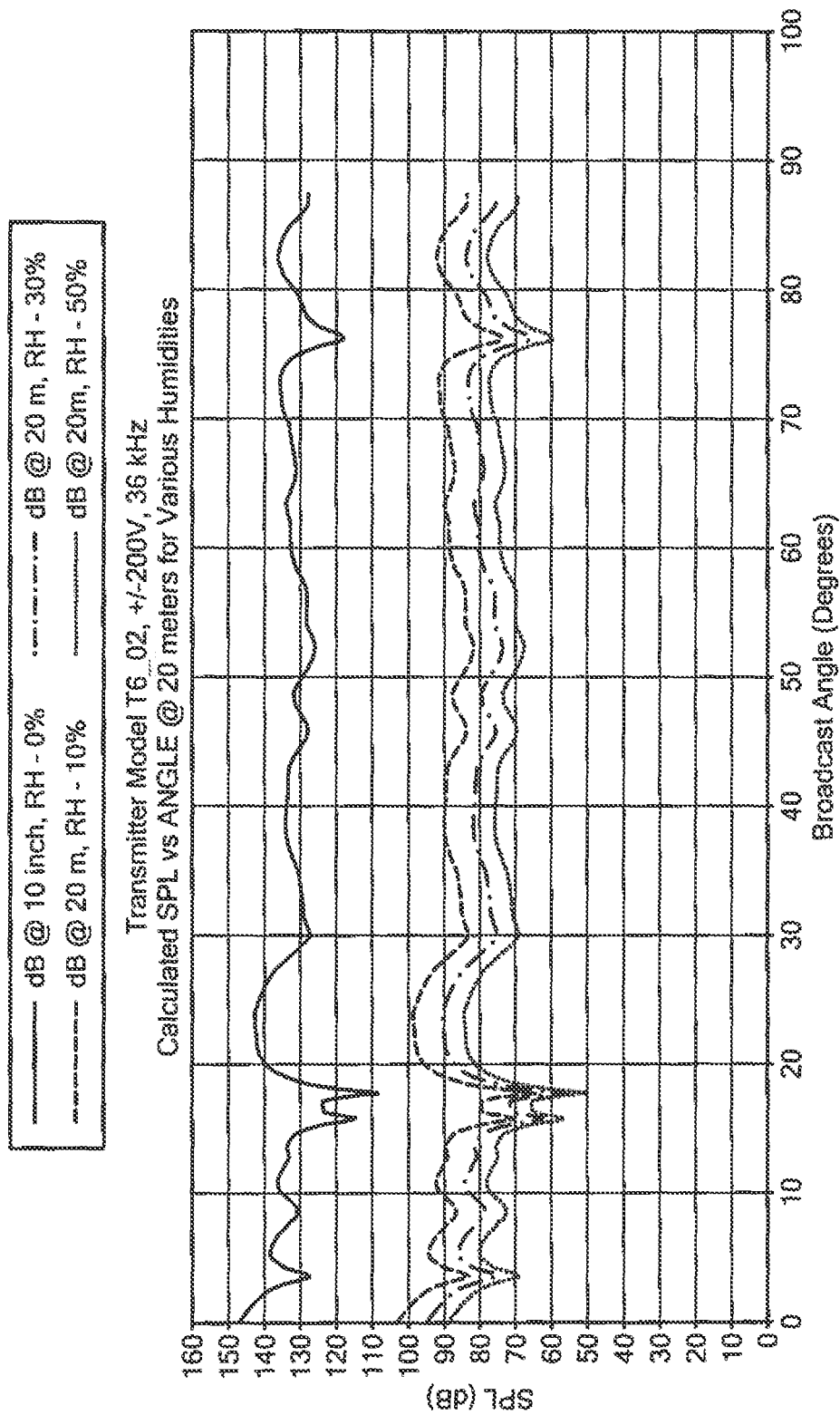
FIG. 5 is a graph of sound pressure levels at various broadcast angles for the ultrasonic transducers of the FIGS. 1-3.

FIG. 5 shows the sound pressure level (SPL in dB) as a function of broadcast angle from the central axis at a single frequency (36 kHz). This is taken from a single point of the frequency analysis run of FIG. 4. The actual analysis result for 10 inch range is shown along with estimates of the SPL which would be received at 20 meter range which are based on the 10 inch range result. The SPL at 20 meter range is shown to decrease with increasing humidity.

The shallow cone of the transducer may be made from thin stainless steel shim stock and is preferably supported and sealed around its perimeter by the housing and driven at an apex by the piezo actuated diaphragm integral to the housing. It may be important to note the distinction between this ultrasonic sound source and a traditional speaker which also consists of a driven cone. A traditional speaker is constructed so that the cone moves back and forth along its axis largely undistorted so that it acts like a piston. As such it is advantageous for its construction to be as light and stiff as possible. The cone in the sound source constructed according to this invention is preferably designed oppositely, to have many resonances within its 20 kHz to 60 kHz operating band. As such it is preferably designed not to move undistorted, but to break into chaotic ripples on its surface (somewhat like a rippling bedsheet) scattering sound waves in all directions. So, it would make an extremely noisy low fidelity speaker.

The results shown in FIGS. 4-5 prove the low profile sound source construction depicted is capable of producing sufficient power acoustic output to satisfy the requirements of deterring bats. In one embodiment, the drive voltage for the piezoelectric element is +/−200 volts.

FIG. 2 also shows optional acoustically transparent wind screen which may include thin plastic membrane of HDPE (high density polyethylene) with a thin metal layer laminated to it to provide a moisture diffusion barrier. It could also be a polyimide flex printed circuit with full copper metal cover 40 for aerodynamic performance and also polyimide flexible printed circuit board 42 which provides a waterproof lamination over piezoelectric element 30 and over the zone defined by circumferential flexure hinge 18'. Inner copper traces make independent electrical contact to the piezoelectric disc and the aluminum housing. A third copper layer on the outer facing surface covers the entire piezoelectric element and the hinge area and thus acts as a water barrier. While the polyimide plastic of the flexible printed circuit board is considered waterproof, it is sufficiently permeable to permit water diffusion over long periods of time. Copper, or indeed any metal, placed on the outer facing surface of the laminated circuit board is considered a barrier to water diffusion, Preferably, the housing central diaphragm portion 14 together with the circumferential flexure hinge portion 18 forms a passive portion of a monomorph flexure disk drive for the speaker cone 20.

In one preferred embodiment, because cone 20 is made of metal and is sealed at the apex 22 to the aluminum housing and at peripheral rim 24 to the aluminum housing, the ultrasonic transducer is protected against environmental conditions encountered on a windmill turbine blade including water exposure, freeze/thaw cycles, and vacuum/pressure cycling. The preferred design of the ultrasonic transducer is not affected in operation or survival when exposed to 20 g accelerations for extended periods of time. The preferred ultrasonic transducer has an extremely low profile to avoid excessive drag and/or noise. Furthermore, the ultrasonic transducer may achieve sound pressure levels of 80 dB at 20 meters axial distance and has a wide angle. The preferred ultrasonic transducer further exhibits a high electrical-to-acoustic energy conversion efficiency in order to minimize power requirements when multiple units are installed on a single turbine blade. The ultrasonic transducer is broad hand covering 20 kHz to 60 kHz.

One or more such ultrasonic transducers may be installed on a single turbine blade or there may be multiple ultrasonic transducers for each turbine blade.

Figure 6:
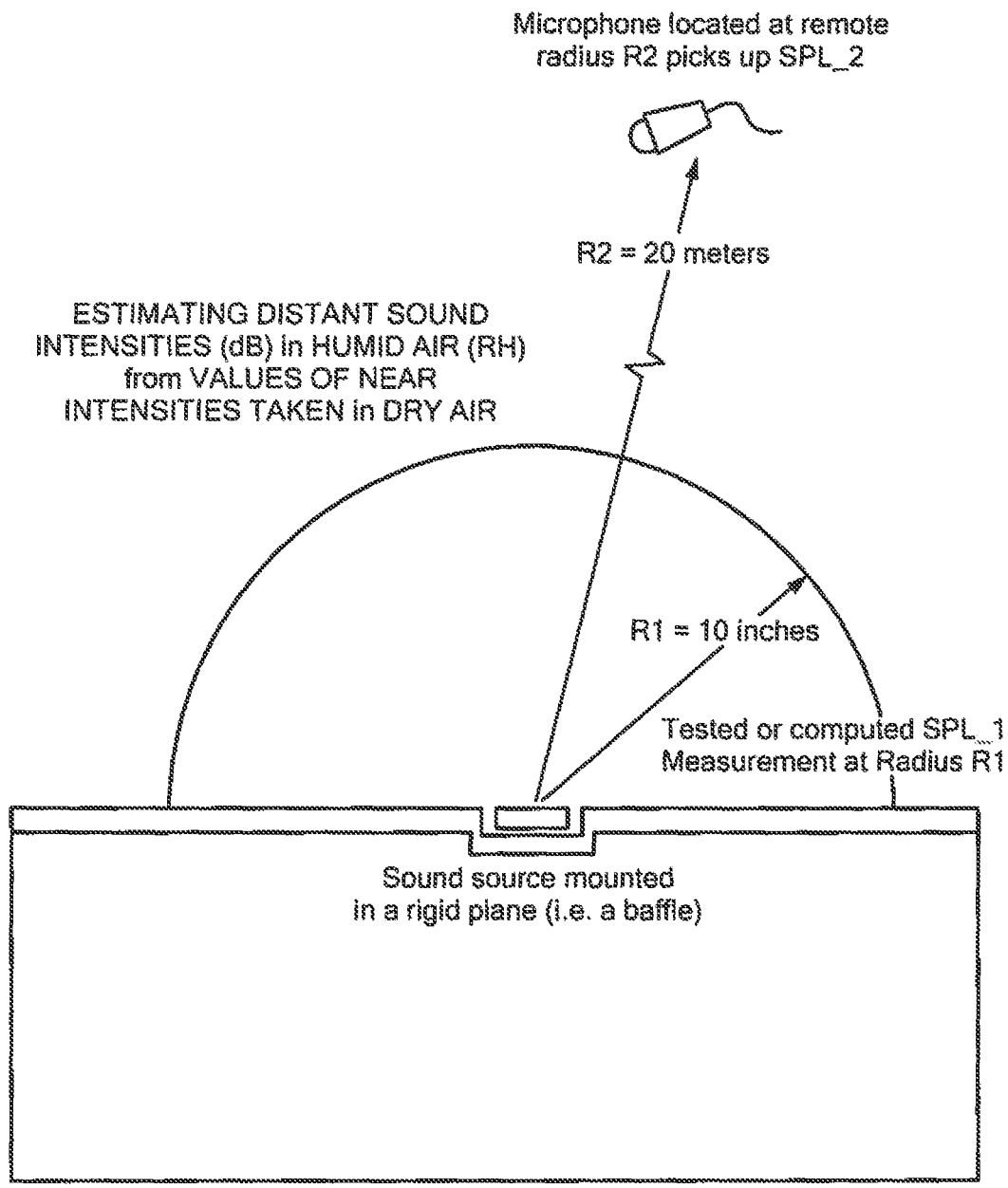
FIG. 6 is a chart showing simulated sound pressure levels.

FIG. 6 shows a sound source embedded in a planar baffle. The sound pressure level (SPL) of our sound source was calculated by FEN/(Finite Element Model) for an operating frequency of 36 kHz at a range of 10 inches (R1). At 36 kHz the wavelength of sound in air is 0.33 inch, therefore R1=10 inch (30 wavelengths) would be considered a far field result and the reduction of SPL at greater distances (R2) can be calculated by standard formula for a piston in an infinite baffle. The chart then shows approximately how the SPL is lowered further by various realistic humidities of the air medium. The dry air SPL at R1=10 inches was 135 dB, therefore for 50% humidity (the worst case on the chart) the SPL at a range of R2=20 meters was still 77 dB, still in the audible intensity range for bats.

Figure 7:
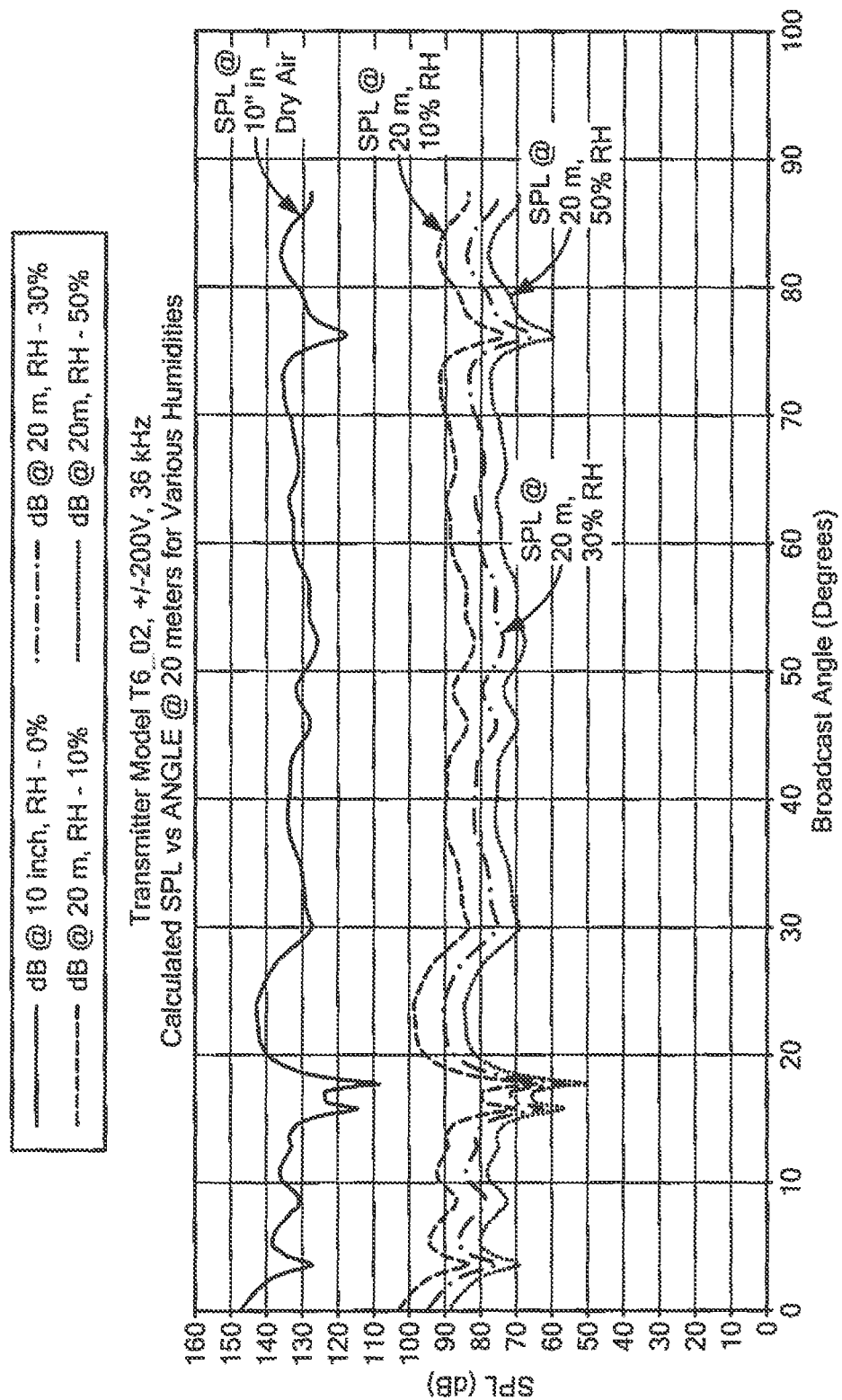
FIG. 7 is a graph of the sound pressure level versus broadcast angle for various relative humidity levels.

FIG. 7 plots the SPL vs, angle from the center axis of the sound source for an operating frequency of 36 kHz. The center axis of the sound source cone is taken as the zero angle, and the graph shows the FEM results for SPL from zero angle out to 90 degrees. It is clear from this plot that the transducer has very near to a 90 degree beam angle from center axis and so has the desirable feature of being non-directional.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as tiled: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. An ultrasonic transducer for wind turbine applications, the transducer comprising:
    a housing including a central diaphragm portion, a peripheral wall thereabout, and a flexure portion supporting the diaphragm portion relative to the peripheral wall;
    a cone having an apex secured to the housing central diaphragm portion and a peripheral rim secured to the metal housing peripheral wall; and
    a driver secured to the housing central diaphragm portion opposite the cone apex.

2. The transducer of claim 1 in which the driver is a piezoelectric element.

3. The transducer of claim 1 in which the housing and cone are made of metal.

4. The transducer of claim 1 in which the flexure is vertically stiff to support the housing central diaphragm portion and the metal cone and compliant in flexure allowing the housing central diaphragm portion to flex.

5. The transducer of claim 1 in which the flexure portion depends downward from the central diaphragm portion.

6. The transducer of claim 5 in which the flexure portion is connected to the peripheral wall by a lateral outwardly extending portion.

7. The transducer of claim 1 in which the flexure portion extends upward from the central diaphragm portion.

8. The transducer of claim 7 in which the flexure portion is connected to the peripheral wall by a lateral outwardly extending portion.

9. The transducer of claim 1 further including a wind screen over the cone.

10. The transducer of claim 9 in which the wind screen is made of an acoustically transparent material.

11. The transducer of claim 1 further including a printed circuit board over the driver.

12. A wind turbine hat deterrent system comprising:
    a wind turbine blade; and
    one or more ultrasonic transducers attached to the blade, each transducer including:
        a housing including a central diaphragm portion, a peripheral wall thereabout, and a flexure portion supporting the diaphragm portion relative to the peripheral wall,
        a cone having an apex secured to the housing central diaphragm portion and a peripheral rim secured to the housing peripheral wall; and
    a driver secured to the housing central diaphragm portion opposite the cone apex.

13. The transducer of claim 12 in which the driver is a piezoelectric element.

14. The transducer of claim 12 in which the housing and cone are made of metal.

15. The transducer of claim 12 in which the flexure is vertically stiff to support the housing central diaphragm portion and the metal cone and compliant in flexure allowing the housing central diaphragm portion to flex.

16. The transducer of claim 12 in which the flexure portion depends downward from the central diaphragm portion.

17. The transducer of claim 16 in which the flexure portion is connected to the peripheral wall by a lateral outwardly extending portion.

18. The transducer of claim 12 in which the flexure portion extends upward from the central diaphragm portion.

19. The transducer of claim 18 in which the flexure portion is connected to the peripheral wall by a lateral outwardly extending portion.

20. The transducer of claim 12 further including a wind screen over the cone.

21. The transducer of claim 20 in which the wind screen is made of an acoustically transparent material.

22. The transducer of claim 12 further including a printed circuit board over the driver.

* * * * *